J. W. YOCHEM.
LICENSE TAG HOLDER.
APPLICATION FILED SEPT. 18, 1911.
1,024,386.
Patented Apr. 23, 1912.
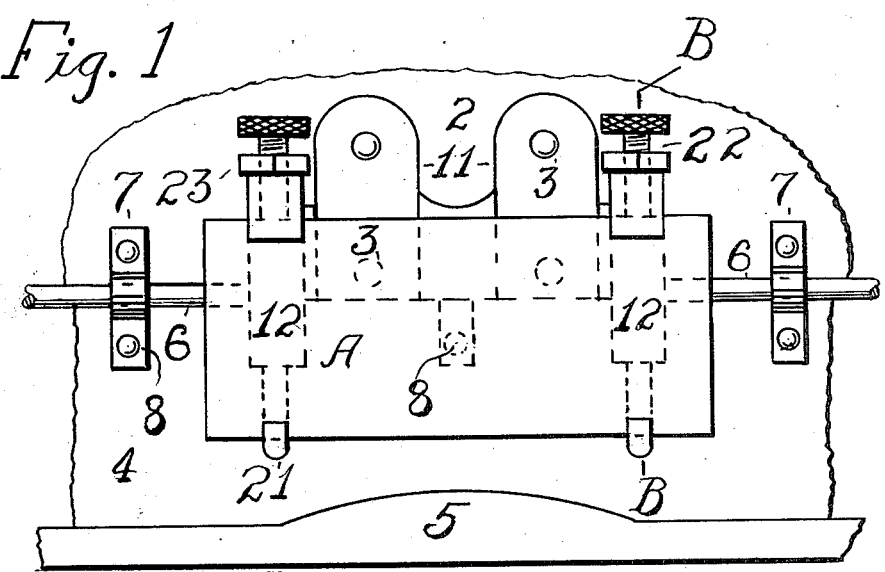
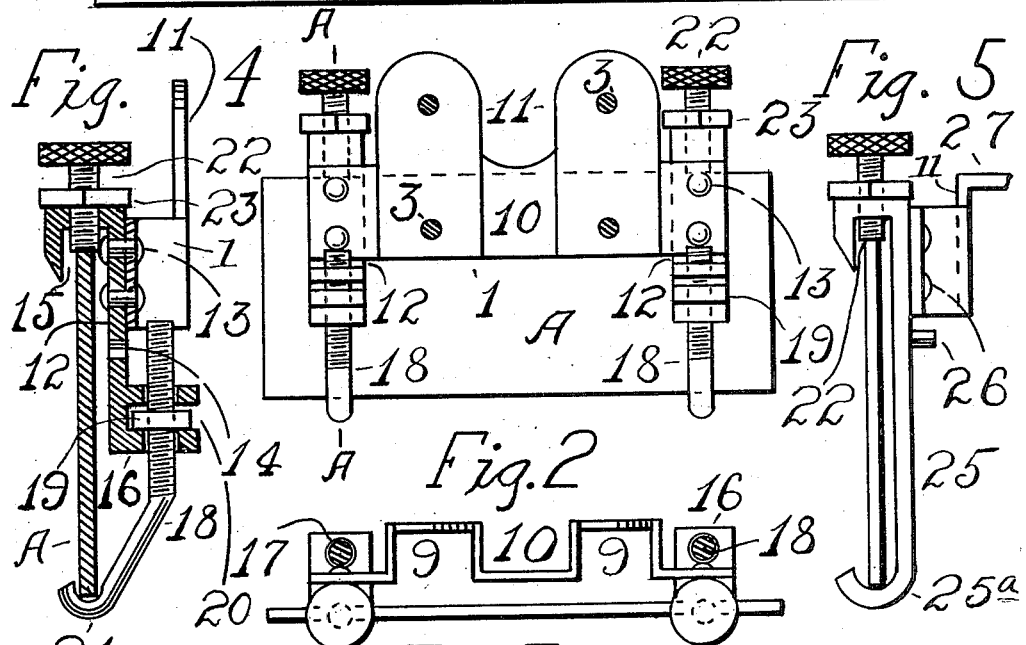
WITNESSES
Carl J. Heffner.
C R Harris
INVENTOR
John W. Yochem
BY
Frank J. Tuttle
ATTORNEY

UNITED STATES PATENT OFFICE.

JOHN W. YOCHEM, OF TIFFIN, OHIO.

LICENSE-TAG HOLDER.

1,024,386.  Specification of Letters Patent.  Patented Apr. 23, 1912.

Application filed September 18, 1911.  Serial No. 649,786.

*To all whom it may concern:*

Be it known that I, JOHN W. YOCHEM, a citizen of the United States, residing at Tiffin, in the county of Seneca and State of Ohio, have invented certain new and useful Improvements in License-Tag Holders, of which the following is a specification.

Inasmuch as the laws of the various States require that motor vehicles shall have their license tags rigidly attached thereto, and displayed in some conspicuous place, both front and rear, it is now the general purpose and object of my invention to provide a holder therefor which may be secured to any suitable part of the vehicle, and which, substantially differing from other similar devices in this respect, by screw threaded adjustment, is made to accommodate and rigidly hold tags of different widths, as one is traveling from State to State, or place to place. And further such, that by abandoning said adjustable features merely, and in anticipation that very soon such tags will be issued in uniform widths, all such tags may be accommodated.

Referring to the drawings: Figure 1 represents my device in front view, the holder being mounted upon the front of an automobile body, and having a tag held in place. Fig. 2 represents a rear view of my device; the same being cut away from the automobile body. Fig. 3 represents a top plan view of the same. Fig. 4 represents a cross section along the line A A of Fig. 2, which is also the line B B of Fig. 1; the vertical scale being somewhat enlarged, and made to approach a true scale. Fig. 5 represents a modification of my device, wherein the adjustable feature is omitted and projecting parts of the wall plate are bent back, the same being seen in end view, and the vertical scale being as in Fig. 4.

More particularly it may now be understood that in construction I provide a suitable wall plate 1, which in the drawings is shown secured to the lower front side of the wind shield 2 by suitable bolts 3. Only a fraction of said wind shield and its supporting dash 4, is shown, the latter being represented as rising above a part of the radiator frame work 5. Between the shield and said dash is shown a section of the frame work 6, in which said shield is usually set. In the present instance I represent said shield as being secured to said dash by suitable straps 7 and bolts 8, the same in all respects as in case of the ordinary touring car. One of said straps is usually located midway of the length of said shield. To make room therefor, as well as for other obvious reasons, chief of which is, that there may be room for the operation of the adjustable features of my device, between said shield and dash, and tag A, I form said plate with two transversely parallel grooves or channels 9, see Fig. 3, thereby creating a groove or channel 10 which accommodates said strap and its fastenings. The rear walls of said channels 9, and an upward extension thereof 11, being provided with suitable apertures, not shown, but made to receive said bolts 3. For the purpose of adjustably carrying said license tag, I mount upon each of the ends of said plate, and preferably upon the front side thereof, a lug or part 12 which is secured thereto by rivets 13 made to pass through suitable apertures therefor, an extra one of which, 14, for purposes hereinafter set forth, is shown in Fig. 4. Contributing to this end, the upper end of said lug is bent forward and made to provide a recess 15 for receiving the upper edge of said tag, while the lower end thereof is provided with a rearwardly projecting bifurcated or slotted arm 16 which in turn is provided with suitable apertures 17, through which a pendant threaded bolt 18 is made to freely operate; said bolt being provided with an engaging nut 19 suitably disposed within the slot 20 of said arm, and having its lower end formed with a curved or bent finger 21 for the support of the lower edge of said tag. Said bolt 18 being suitably adjusted to permit of receiving said tag, it may now be understood that the same is rigidly held in place by means of the knurled headed thumb screw 22, one of which is provided for each of said lugs or parts 12, and which is threaded into the upper end of said lug and made to impinge upon the upper edge of said tag. 23 is a lock or jam nut, with which said screw is provided for holding the same in place when turned, and set.

In the drawings I have represented my holder as secured to the lower front side of the wind shield; but it should now be understood that by reason of its structure it is adapted, and intended, to be secured to other parts of the vehicle, and in other places, where it may be desired, whether front side or rear. To this end I have provided the extra aperture 14 to permit of reversing the plate 1, so that the extensions 11 may be gotten out of the way, and the plate itself be thereby somewhat lowered, thus permitting the tag to be raised as high as possible when it is placed under an obstruction, such as the crank, which is a favored place for hanging such tags.

Referring to Fig. 5, which is a modified form of my invention, I show the lug 25, which corresponds to the lug 12 in the other drawings, without the adjustable features which are shown in Fig. 4, the lower end thereof being merely provided with a suitable supporting finger 25ª; the purpose of all which is to anticipate a time when by common consent or otherwise, the several tags of each State will be of the same width, when no adjustment will be required. In this modification, said lug is provided with suitable studs 26, by which said plate 1 is secured thereto, and the extension 11 is bent back to form a rearwardly projecting flange 27, for permitting the same to be secured to a projecting ledge or other like place, such as the upper side of one of the springs with which automobiles are usually provided. When used in such a location it will be understood that the same is secured in place by means of a bolt 3, which is made to pass through an aperture therefor near the outer end of the flanged portion of said extension, the same as in case of Figs. 1 and 2, but which in the drawing is broken away and therefore not shown. While I have not represented said extension 11 in the other drawings, as being flanged, it should now be understood that in practice I make the plate 1 of such material, that said extension may be bent or flanged as required, and thereby permit of mounting said holder in any suitable location.

Having now fully described my invention what I claim as new is:

1. In a device of the character described the combination of a perforated wall plate having a pair of transversely and rearwardly extending channels formed therein, holding lugs vertically mounted on said plate, one for each of the ends thereof, the upper end of each of which is provided with a transversely extending recess, the side walls of which are parallel with the general plane of said plate, and with a vertically operating thumb screw which passes therethrough and enters said recess; and the lower end of each of which lugs is provided with a rearwardly projecting bifurcated arm, the several members of which are each provided with a bolt receiving aperture which extends vertically therethrough, and between which members is provided a horizontally extending nut receiving slot; a nut in said slot together with an adjusting bolt, the upper end of which is made to operate through said apertures, and to threadedly engage said nut, and the lower end of which is provided with a suitably curved or bent finger; all substantially as and for the purpose set forth.

2. In a device of the character described the combination of a perforated wall plate having a pair of transversely and rearwardly extending channels formed therein, the rear walls of which are each severally provided with a perforated extension; holding lugs vertically mounted thereon and carried thereby, one for each of the ends of said plate, the upper end of said lug being provided with a transversely extending recess, the side walls of which are parallel with the general plane of said plate, and with a vertically operating thumb screw which passes therethrough and enters said slot; and the lower end thereof being provided with a suitably curved or bent finger; all substantially as and for the purpose set forth.

In testimony whereof I affix my signature in presence of two witnesses.

JOHN W. YOCHEM.

Witnesses:
FRANK J. TUTTLE,
CARL J. HEFFNER.

---

Copies of this patent may be obtained for five cents each, by addressing the "Commissioner of Patents, Washington, D. C."